US011291031B2

(12) United States Patent
Bae et al.

(10) Patent No.: US 11,291,031 B2
(45) Date of Patent: Mar. 29, 2022

(54) METHOD AND DEVICE FOR TRANSMITTING/RECEIVING SIGNAL ASSOCIATED WITH GRANT-FREE RESOURCE IN WIRELESS COMMUNICATION SYSTEM

(71) Applicant: LG Electronics Inc., Seoul (KR)

(72) Inventors: Duckhyun Bae, Seoul (KR); Yunjung Yi, Seoul (KR); Daesung Hwang, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 16/481,904

(22) PCT Filed: Feb. 5, 2018

(86) PCT No.: PCT/KR2018/001491
§ 371 (c)(1),
(2) Date: Jul. 30, 2019

(87) PCT Pub. No.: WO2018/143738
PCT Pub. Date: Aug. 9, 2018

(65) Prior Publication Data
US 2020/0045722 A1 Feb. 6, 2020

Related U.S. Application Data

(60) Provisional application No. 62/617,078, filed on Jan. 12, 2018, provisional application No. 62/520,546, (Continued)

(51) Int. Cl.
*H04W 72/12* (2009.01)
*H04W 72/04* (2009.01)

(52) U.S. Cl.
CPC ... *H04W 72/1284* (2013.01); *H04W 72/1268* (2013.01); *H04W 72/0446* (2013.01)

(58) Field of Classification Search
CPC ........ H04W 72/1268; H04W 72/1284; H04W 72/04; H04W 72/0446; H04W 72/1242; H04L 5/0044; H04L 5/0053; H04L 5/0078
See application file for complete search history.

(56) References Cited

U.S. PATENT DOCUMENTS

2011/0310986 A1\* 12/2011 Heo ...................... H04W 76/27
375/259
2012/0113831 A1\* 5/2012 Pelletier ................ H04L 5/0058
370/252
(Continued)

FOREIGN PATENT DOCUMENTS

KR 1020140090958 A 7/2014

OTHER PUBLICATIONS

Ma et al., "system and method for uplink transmission", Nov. 17, 2016, Huawei Technologies Co., Ltd., U.S. Appl. No. 62/423,740, Total pp. 50 (Year: 2016).\*
(Continued)

*Primary Examiner* — Shah M Rahman
(74) *Attorney, Agent, or Firm* — Dentons US LLP

(57) ABSTRACT

A method for a terminal performing transmission using a grant-free resource in a wireless communication system is a method for transmitting/receiving a signal associated with a grant-free resource, the method comprising the steps of: generating uplink control information (UCI); and transmitting at least one among the generated UCI and data, wherein the transmission of at least one among the UCI and the data is dropped or delayed according to a correlation between the time point at which the UCI was generated and the position of the grant-free resource on a time axis.

9 Claims, 12 Drawing Sheets

Related U.S. Application Data filed on Jun. 15, 2017, provisional application No. 62/454,873, filed on Feb. 5, 2017.

(56) References Cited

U.S. PATENT DOCUMENTS

| | | | |
|---|---|---|---|
| 2015/0208402 A1 | 7/2015 | Hwang et al. | |
| 2015/0257150 A1* | 9/2015 | Yi | H04B 7/26 370/329 |
| 2015/0304088 A1* | 10/2015 | Seo | H04W 72/0413 370/277 |
| 2017/0332358 A1* | 11/2017 | Park | H04W 72/042 |
| 2018/0035459 A1* | 2/2018 | Islam | H04W 74/04 |
| 2018/0110042 A1* | 4/2018 | Chen | H04L 5/0057 |
| 2018/0139773 A1* | 5/2018 | Ma | H04L 5/0007 |
| 2018/0176937 A1* | 6/2018 | Chen | H04W 74/085 |
| 2018/0199359 A1* | 7/2018 | Cao | H04W 28/04 |
| 2019/0349923 A1* | 11/2019 | Shao | H04L 1/1887 |
| 2020/0259622 A1* | 8/2020 | Cao | H04L 1/1819 |
| 2020/0260453 A1* | 8/2020 | Zeng | H04W 72/0413 |
| 2020/0322995 A1* | 10/2020 | Au | H04W 74/0841 |
| 2020/0396698 A1* | 12/2020 | Bala | H04L 5/0005 |

OTHER PUBLICATIONS

R1-1611689:3GPP TSG RAN WG1 Meeting #87, Reno, Nevada, US, Nov. 14-18, 2016, "Grant-free transmission scheme for UL URLLC," Huawei, HiSilicon, pp. 1-9.

R1-1611999: 3GPP TSG RAN WG1 Meeting #87, Reno, USA, Nov. 14-18, 2016, "UCI embedding onto UL data channels," Intel Corporation, pp. 1-3.

R1-1612571:3GPP TSG RAN WG1 Meeting #87, Reno, Nevada, USA, Nov. 14-18, 2016,"Grant-free based multiple access," Samsung, pp. 1-4.

Catt, "UL collision handling for eMTC", 3GPP TSG RAN WG1 Meeting #84, Feb. 15-19, 2016, R1-160352.

Samsung, "Update on Summary of Collision Handling Aspects for LC/CE UEs", 3GPP TSG RAN WG1 #84, Feb. 15-19, 2016, R1-161377.

* cited by examiner

FIG. 5
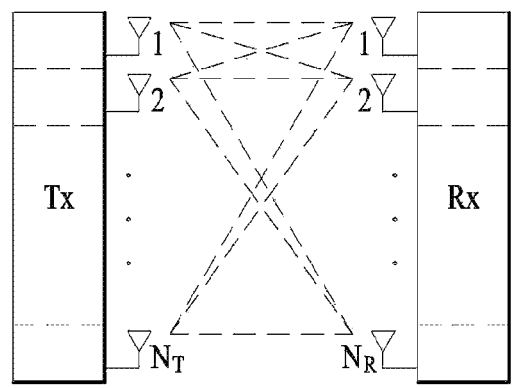
(a)
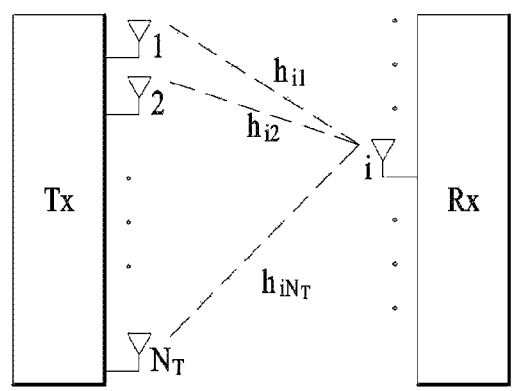
(b)

FIG. 8
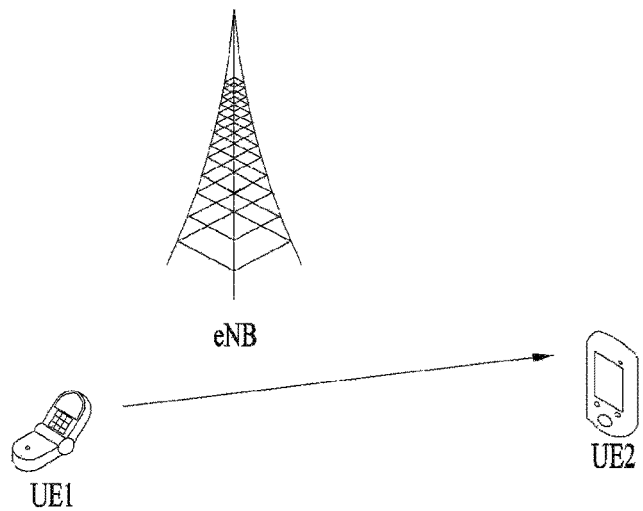
(a)
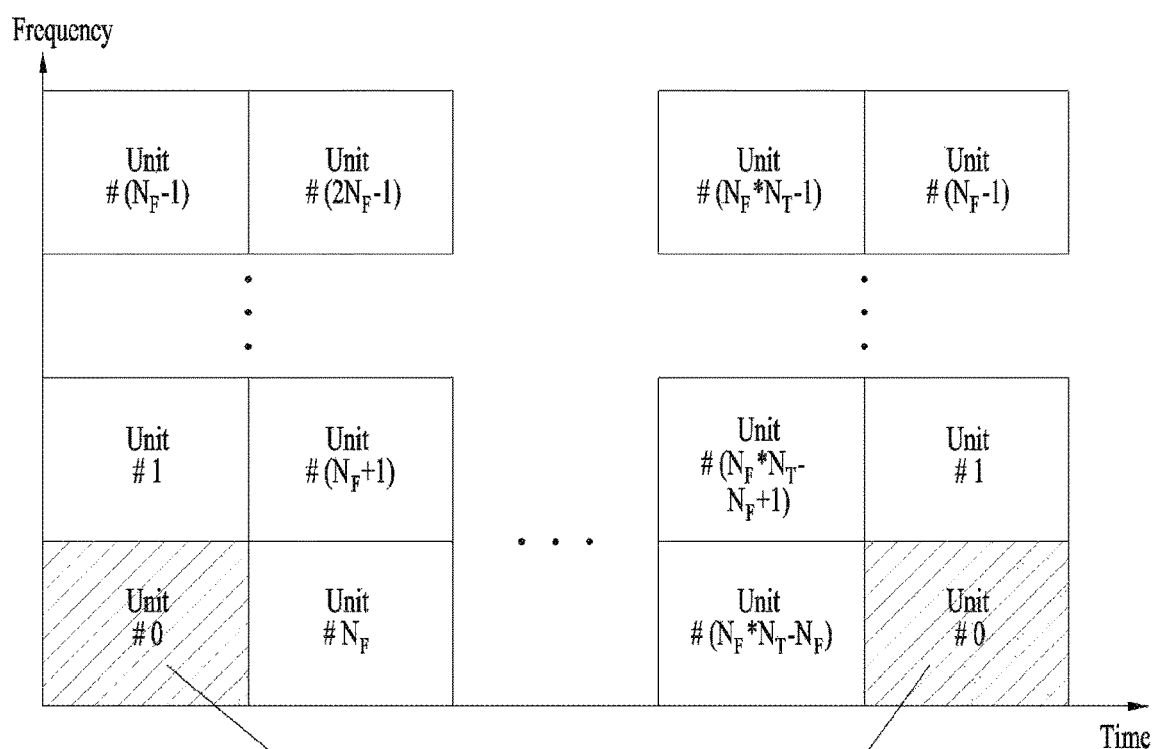
(b)

METHOD AND DEVICE FOR TRANSMITTING/RECEIVING SIGNAL ASSOCIATED WITH GRANT-FREE RESOURCE IN WIRELESS COMMUNICATION SYSTEM

This application is a National Stage Entry of International Application No. PCT/KR2018/001491 filed Feb. 5, 2018, which claims the benefit of U.S. Provisional Application Nos. 62/454,873 filed Feb. 5, 2017; 62/520,546 filed Jun. 15, 2017 and 62/617,078 filed Jan. 12, 2018, all of which are hereby incorporated by reference in their entirety for all purposes as if fully set forth herein.

TECHNICAL FIELD

The following description relates to a wireless communication system, and more particularly, to a method and device for transmitting/receiving, by a terminal, a signal such as uplink control information associated with a grant-free resource.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

An object of the present disclosure is to provide methods for using grant-free resources for uplink transmission.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present invention, provided herein a method for performing transmission by a terminal using a grant-free resource in a wireless communication system, the method including generating uplink control information (UCI), and transmitting at least one of the generated UCI and data, wherein one or more of the UCI and the data is dropped or postponed according to a relationship between a time at which the UCI is generated and a time-domain position of the grant-free resource.

In another aspect of the present invention, provided herein is a terminal for performing transmission using a grant-free resource in a wireless communication system, the terminal including a transmission device and a reception device, and a processor, wherein the processor is configured to generate uplink control information (UCI), and transmit at least one of the generated UCI and data, wherein one or more of the UCI and the data is dropped or postponed according to a relationship between a time at which the UCI is generated and a time-domain position of the grant-free resource.

When the time at which the UCI is generated may be before a start time of the grant-free resource, the terminal drops transmission of one of the UCI and the data according to a service associated with the data.

When the UCI is piggybacked on transmission of the grant-free resource, the UCI may be transmitted only in a specific transmission.

The specific transmission may be one of an initial transmission of the grant-free resource, a last transmission of the grant-free resource, or a transmission determined by a base station.

When the time at which the UCI is generated is within a time interval of the grant-free resource, the terminal may drops transmission of one of the UCI and the data according to a service associated with the data in a next repeated transmission within the grant-free resource.

The terminal may transmit the non-dropped UCI or data in a next grant-free transmission.

When the time at which the UCI is generated is after an end time of the grant-free resource, either the UCI or the data to be dropped may be determined further considering a latency requirement.

When the UCI corresponds to a latency requirement shorter than a preset value and there is no available resource within the latency requirement, the terminal may drop the UCI.

When the UCI corresponds to a latency requirement longer than a preset value, the terminal may postpone transmission of the UCI.

When the UCI corresponds to the latency requirement longer than the preset value and there is no available resource within the preset time, the terminal may drop transmission of the UCI.

When the UCI is piggybacked on transmission of the data, whether to perform piggybacking may be determined each time a PUCCH resource is repeated.

When the terminal drops transmission of the user data for transmission of the UCI, the dropped data may be transmitted in a next available resource.

The next available resource may be a next transmission occasion for repetition of the dropped PUSCH.

Advantageous Effects

According to the present invention, uplink radio resources having different transmission methods and properties such as grant-free and grant-based uplink resources may be efficiently utilized. Unnecessary signaling for resource selection between the terminal and the base station may be reduced.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE

Figure 1:
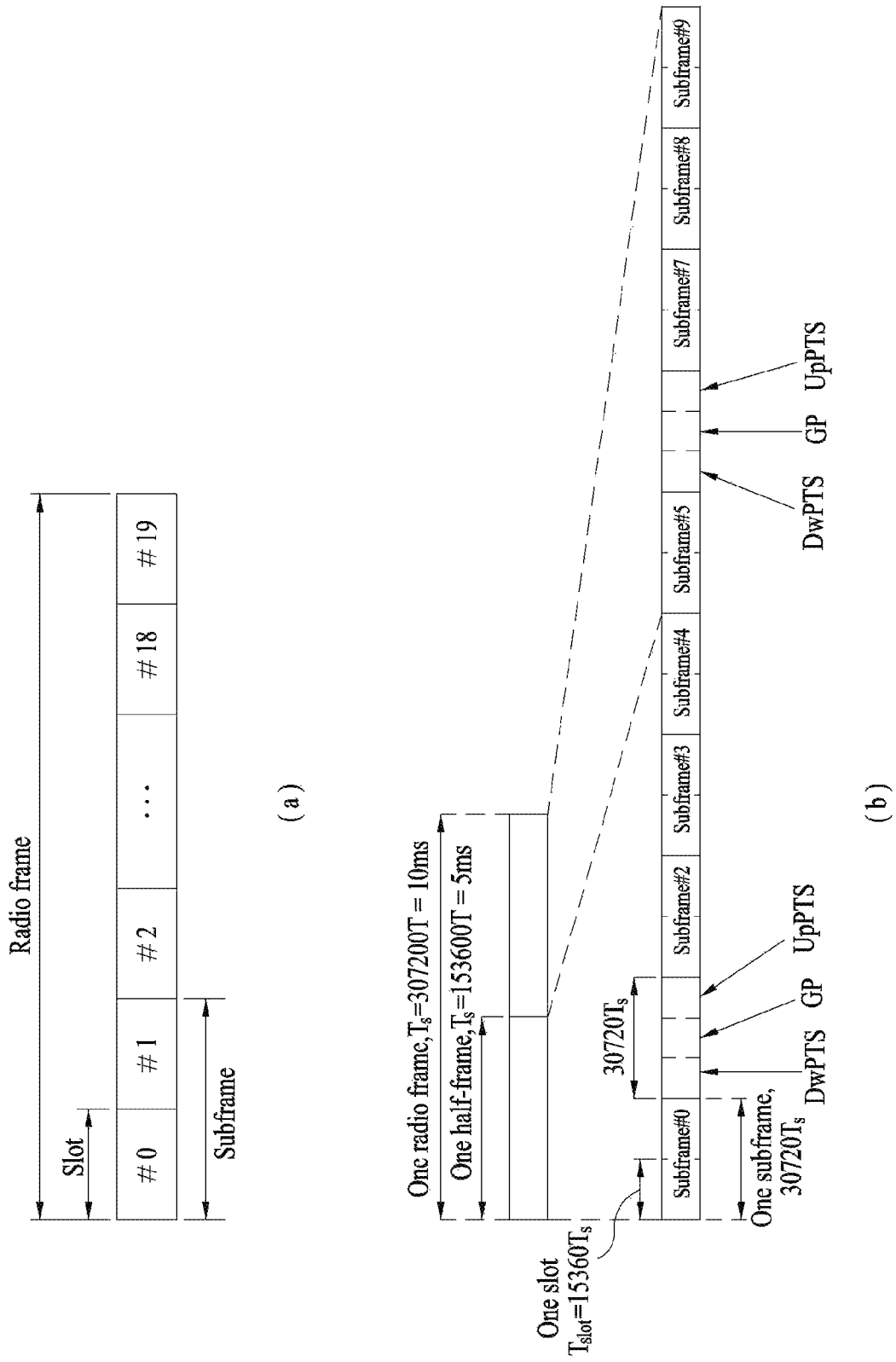
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, focusing on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
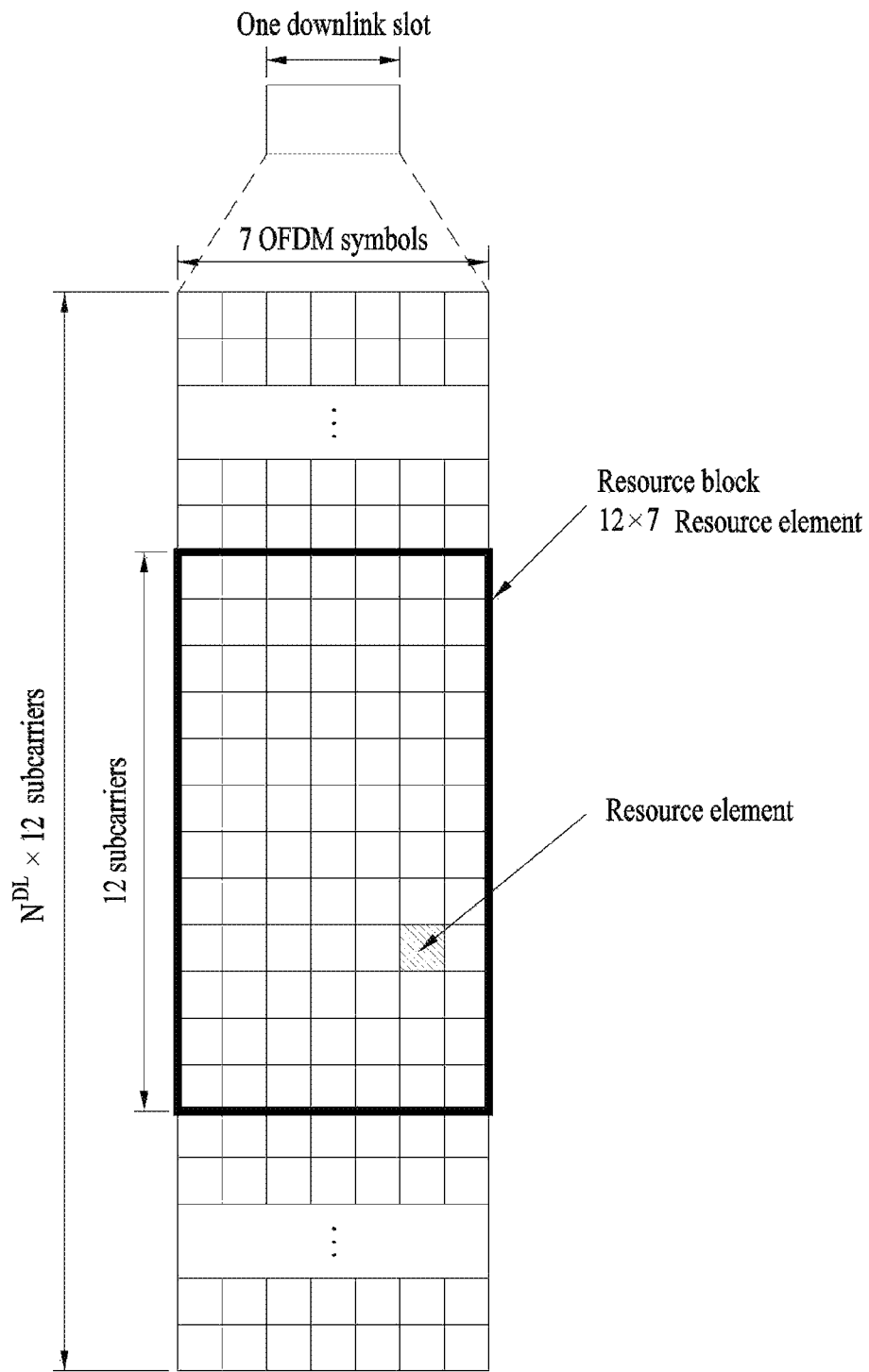
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
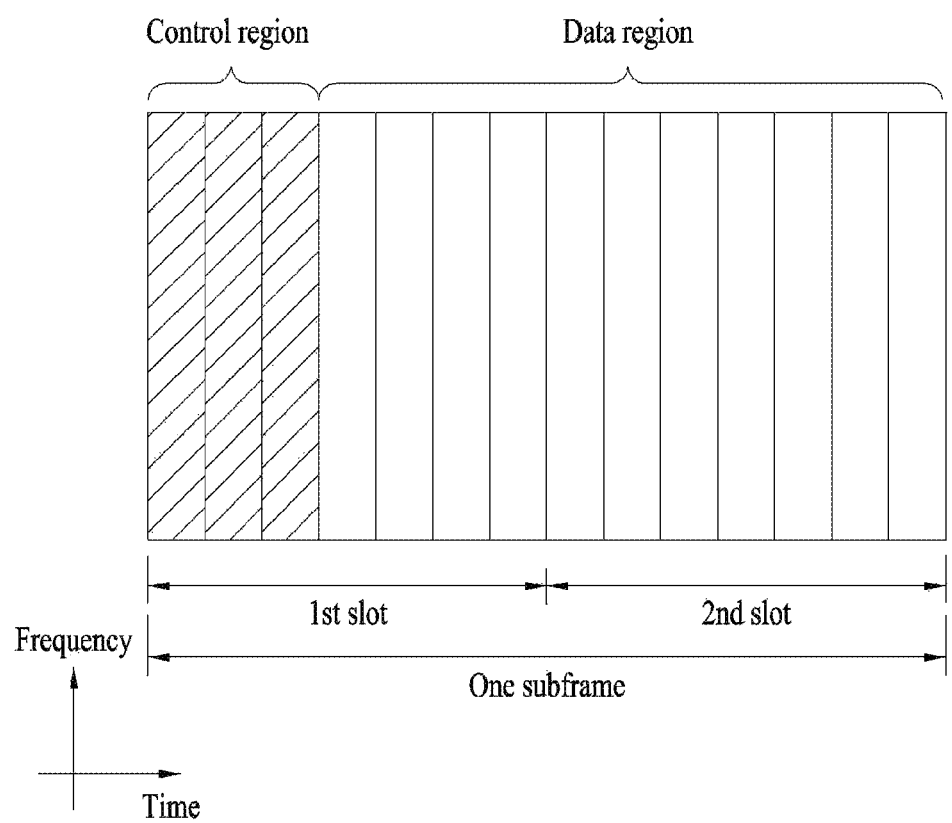
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
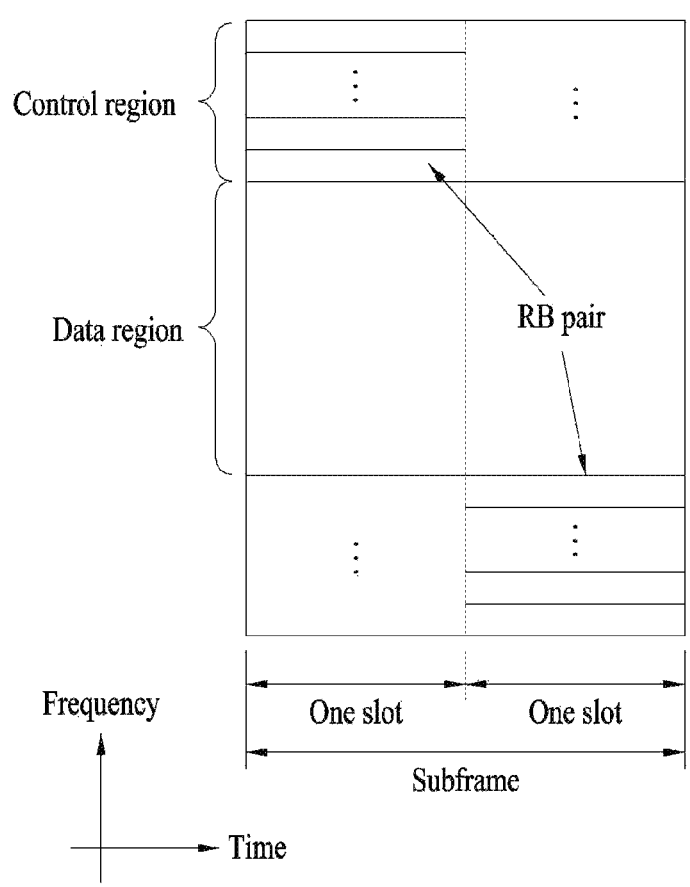
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO related studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Transmit powers for individual pieces of transmission information $s_1, s_2, \ldots, s_{N_T}$ can be set different from each other. When the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{s}$ having the adjusted transmit powers, the weight matrix W serves to appropriately distribute the transmission information to each antenna according to a transport channel state. $x_1, x_2, \ldots, x_{N_T}$ can be expressed by using the vector x as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix.

In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

The number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
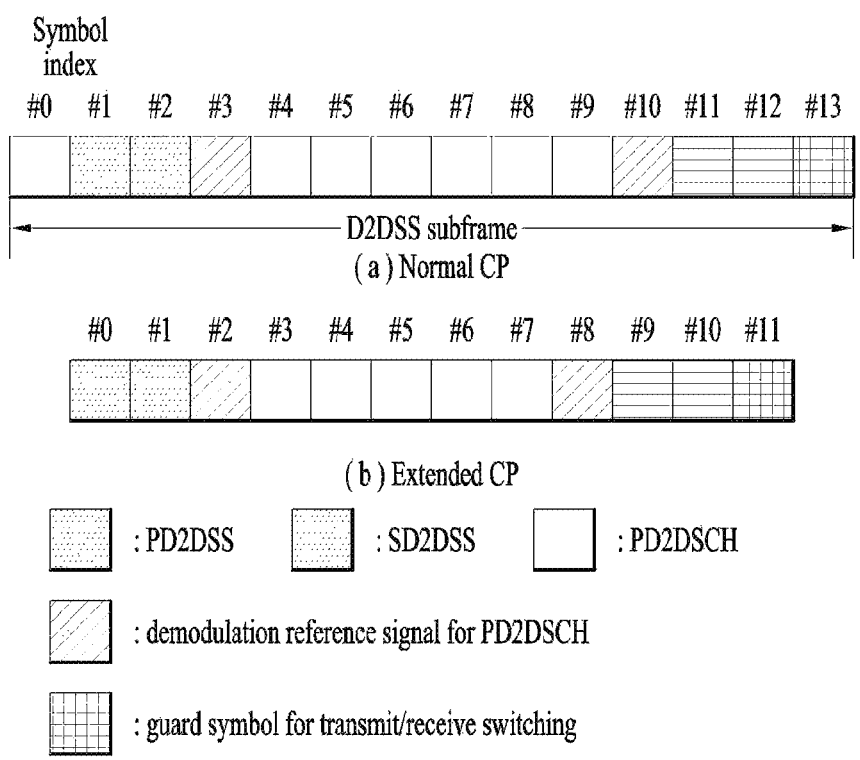
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
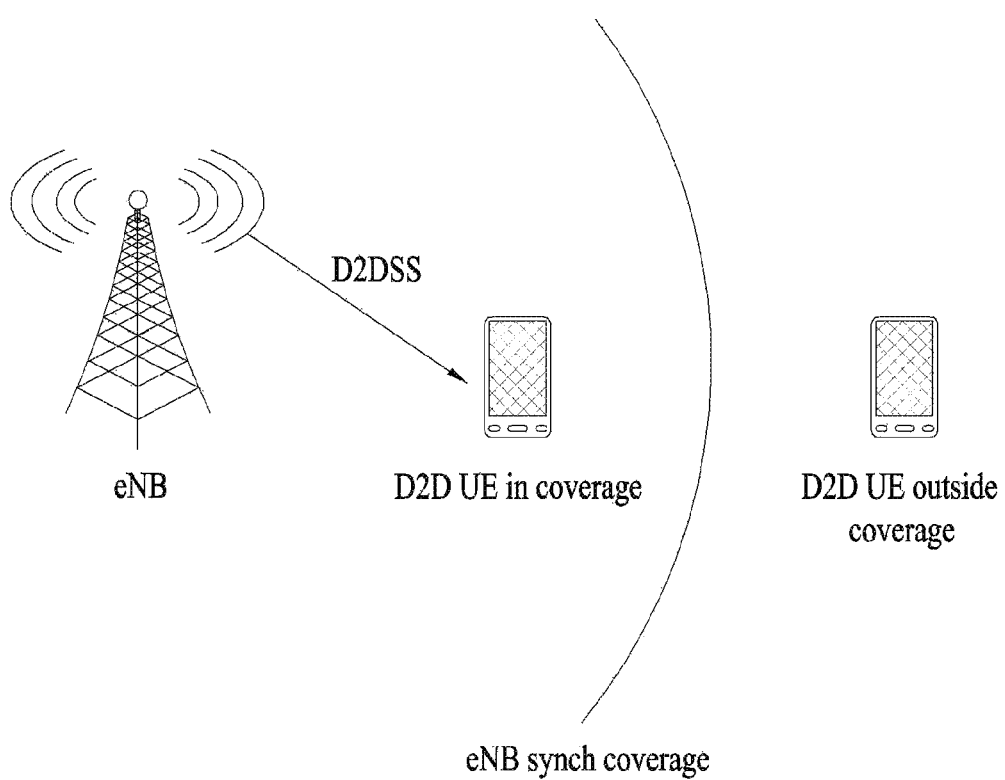
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
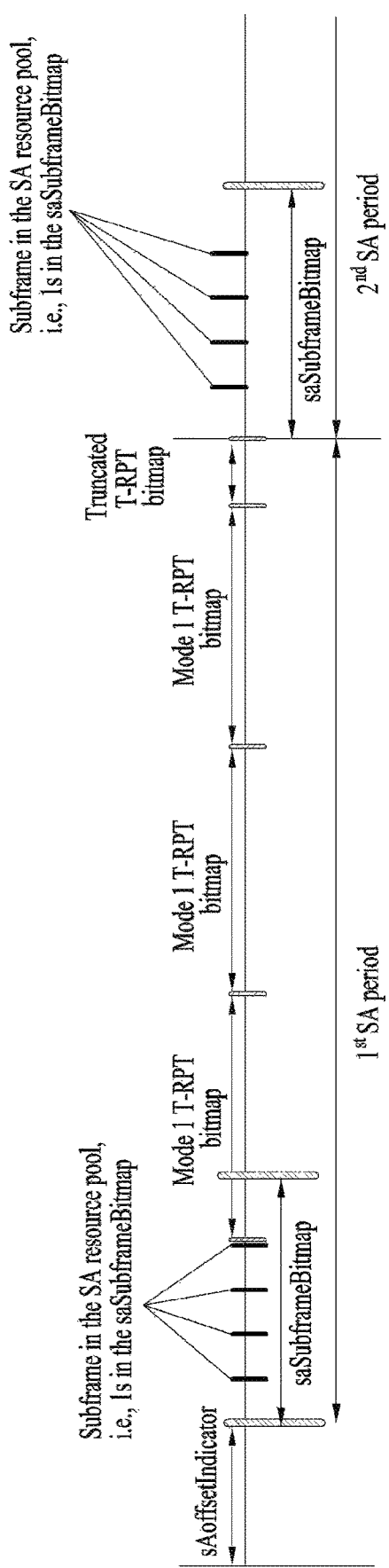
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

In vehicle-to-vehicle communication, a Cooperative Awareness Message (CAM) of a periodic message type, a Decentralized Environmental Notification Message (DENM) of an event triggered message type, and the like may be transmitted. The CAM may contain basic vehicle information such as dynamic state information about a vehicle including the direction and speed, static vehicle data such as dimensions, external lighting conditions, and route history. The size of the CAM message may be 50 to 300 bytes. The CAM message shall be broadcast and the latency shall be shorter than 100 ms. The DENM may be a message generated in an unexpected situation such as a vehicle malfunction or an accident. The size of the DENM may be less than 3000 bytes, and any vehicle within the transmission range may receive the message. In this case, the DENM may have a higher priority than the CAM. Having a high priority may mean that when transmissions are triggered simultaneously from the perspective of a UE, a transmission with a higher priority is preferentially performed, or mean that transmission of a message with a higher priority among multiple messages is preferentially attempted in terms of time. From the perspective of multiple UEs, a message with a higher priority may be set to be less subjected to interference than a message with a lower priority to lower the probability of reception errors. CAMs may also have a larger message size if they include security overhead.

NR (New Radio Access Technology (RAT))

As more and more communication devices require higher communication capacity, there is a need for mobile broadband communication improved over the existing radio access technology. Massive Machine Type Communications (MTC), which provide various services anywhere anytime by connecting many devices and objects, is one of the major issues to be considered in next generation communication. In addition, communication system design considering services/UEs sensitive to reliability and latency is under discussion. As such, introduction of next-generation radio access technology considering enhanced mobile broadband communication, massive MTC, and Ultra-Reliable and Low Latency Communication (URLLC) is being discussed. In the present disclosure, such technology is referred to as NR for simplicity.

Figure 10:
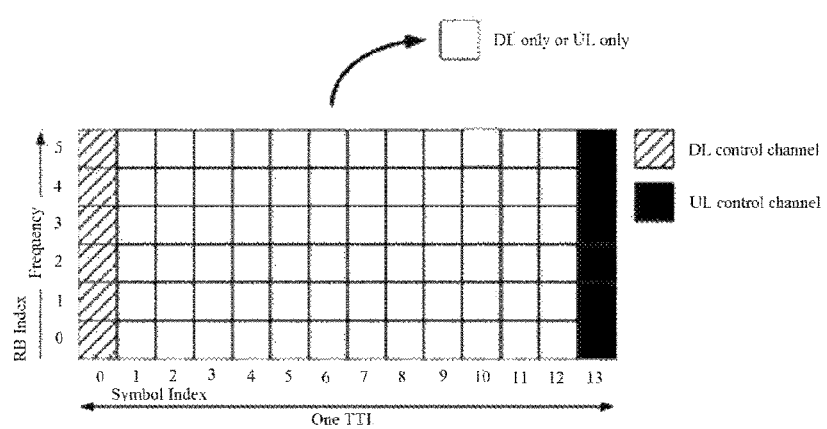
FIG. 10 illustrates a frame structure applicable to the new RAT.

In order to minimize the data transmission latency in the TDD system, the fifth generation new RAT is considering a self-contained subframe structure as shown in FIG. 10. In FIG. 10, the hatched area indicates the downlink control region, and the black area indicates the uplink control region. The unmarked area may be used for downlink data transmission or for uplink data transmission. The feature of this structure is that DL transmission and UL transmission are sequentially performed in one subframe. Thus, DL data may be transmitted and UL Ack/Nack may be received in the subframe. As a result, the time required to retransmit data when a data transmission error occurs may be reduced. Thereby, the latency of final data transmission may be minimized Such a self-contained subframe structure requires a time gap for the operation of the base station and the UE switching from transmit mode to receive mode or from receive mode to transmit mode is needed. To this end, some OFDM symbols at the time of switching from DL to UL in the subframe structure are configured as a guard period (GP).

Analog Beamforming

In the mmW system, a short wavelength is used, and thus a plurality of antennas can be installed in the same area. In other words, in the 30 GHz band, the wavelength of 1 cm, and accordingly a total of 100 antenna elements may be installed in a 2-dimensional array at 0.5 lambda (wavelength) intervals on a 5 by 5 cm panel. Therefore, in the mmW system, multiple antenna elements may be used to increase the beamforming (BF) gain to improve the coverage or the throughput.

In this case, if each antenna element is provided with a transceiver unit (TXRU) to enable adjustment of transmit power and phase per antenna element, independent beamforming may be performed for each frequency resource. However, installing TXRUs in all the 100 antenna elements is less feasible in terms of cost. Therefore, a method of mapping a plurality of antenna elements to one TXRU and adjusting the direction of a beam using an analog phase shifter has been considered. However, this analog beamforming method is disadvantageous in that frequency selective beamforming is not allowed because only one beam direction can be created over the full band.

As an intermediate form of digital BF and analog BF, hybrid BF with B TXRUs that are fewer than Q antenna elements may be considered. In the case of the hybrid BF, the number of directions in which beams can be transmitted at the same time is limited to B or less, which depends on how B TXRUs and Q antenna elements are connected.

Grant-Free Resources and Transmission Using the Same

For the next-generation system, grant-free transmission in which a UE performs UL transmission on semi-persistent resources without receiving UL grant according to application fields or traffic types has been discussed. In the grant-free transmission, radio resources shared by different UEs in a contention-based manner or radio resources dedicatedly allocated to a UE may be used. Since the grant-free transmission does not require UL grant reception operation prior to transmission, it may be used for services or traffic in a field requiring low latency. For radio resources used for the grant-free transmission, modulation and coding schemes, a transport block size, or a Transmission Time (TT) interval different from those for radio resources allocated through UL grant may be used. The TT interval may be a basic unit for scheduling of a specific physical channel. The reference time unit may be changed according to the number of symbols constituting a corresponding scheduling unit and/or subcarrier spacing. These grant-free resources may be semi-persistently allocated in general. The UE needs to send control information other than user data according to its own needs or at the request of the base station. Uplink control information (UCI) is generally transmitted on a physical channel different from that for user data, or is transmitted in the user data. In new RAT, a more flexible frame structure is being discussed, and accordingly it cannot be assumed that the physical channel for UCI, that is, the physical uplink control channel (PUCCH), is always present. Delay of UCI transmission may sometimes increase transmission latency or degrade performance of the wireless communication system. Therefore, it is necessary to consider utilization of semi-persistently allocated grant-free uplink resources for UCI transmission to address such an issue. The UE may be allocated the PUCCH and the PUSCH in one scheduling interval simultaneously. Even if a PUCCH necessary for UCI transmission is present, it is necessary to consider a method for the UE to use the PUCCH and a grant-free uplink resource at the same time. Therefore, considering various situations, it is necessary to develop a method for a UE to handle UCI or PUCCH and grant-free uplink resource information that need to be transmitted when the UE acquires the UCI or PUCCH and the grant-free uplink resource information simultaneously.

Embodiments

Hereinafter, a method for determining priority of radio resource information or whether to use the radio resource information when there is UCI to be transmitted or an available PUCCH for a UE having acquired a rant-free uplink resource, and a method for transmitting UCI using the radio resource information based on the priority or whether to use the radio resource information will be described based on the above description.

Transmission of UCI and PUSCH Associated with Grant-Free Resource

Figure 11:
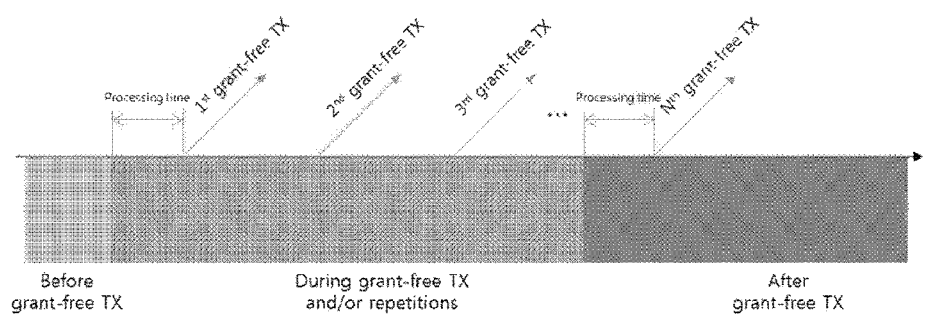
FIG. 11 is a view illustrating an embodiment of the present invention.

A UE according to an embodiment of the present invention may generate UCI and transmit at least one of the generated UCI and data. Here, depending on the relationship between the generation time of the UCI and a time-domain position of the grant-free resources, transmission of at least one of the UCI and the data may be dropped or postponed. The generation time of the UCI may be divided into three cases as shown in FIG. 11. Specifically, the time at which the UCI is generated may be a time (hereinafter referred to as time 1) before a start time of a grant-free resource (before grant-free transmission), a time (hereinafter referred to as time 2) within a time interval of a grant-free resource (during grant-free transmission and/or repetitions), or a time (hereinafter referred to as time 3) after an end time of a grant-free resource (after grant-free transmission and/or repetitions).

i) The time at which the UCI is generated is before the start time of a grant-free resource:

If the time at which the UCI is generated is before the start time of the grant-free resources, the UE may drop transmission of one of the UCI and the data according to a service associated with the data. If the time at which the UCI is generated is before the start time of the grant-free resources, time 1 corresponds to a case where UCI is generated for a UE that is not currently performing grant-free transmission. That is, this case may include a case where UCI required to be transmitted is generated when there is no grant-free PUSCH traffic in the buffer of the UE or a case where UCI is generated when there is grant-free PUSCH traffic in the buffer of the UE, but there is no available grant-free resource at the corresponding time. In this case, the generated UCI may be transmitted together with the next grant-free transmission, or may be transmitted on the PUCCH. However, the PUCCH may not be allowed to be used due to a dynamic or semi-static cell configuration or change of the slot format. The UE may not use the PUCCH resource because grant-free PUSCH traffic to be prioritized is generated when the UE cannot use the PUCCH and the grant-free PUSCH simultaneously. Accordingly, depending on a service associated with the UCI or the user data, transmission of one of the UCI and the user data may be dropped or postponed. In particular, presence or absence of a PUCCH resource available in the case where the user data is dropped or postponed may be considered.

Regarding dropping or delaying the user data, in the case where the UCI is associated with a latency-sensitive service (e.g. URLLC) and the user data is associated with a latency-tolerant service (e.g., eMBB), when there is a PUCCH available, the user data may be dropped and the UCI may be transmitted on the PUCCH. If there is no available PUCCH resource, the UCI may be piggybacked on a grant-free resource or only the UCI may be transmitted on the grant-free resource. In the case where the user data is associated with a latency-sensitive service (e.g. URLLC) and the UCI is associated with a latency-tolerant service (e.g., eMBB), the UCI may be dropped. In the case where the UCI and the user data are associated with the same latency-tolerant service (e.g., eMBB), when there is a PUCCH available, the user data may be dropped and the UCI may be transmitted on the PUCCH. If there is no available PUCCH resource, the UCI may be piggybacked on the grant-free resource or only the UCI may be transmitted on the grant-free resource. Alternatively, in the case where the UCI and the user data are associated with the same latency-sensitive service (e.g., URLLC), the UCI may be piggybacked on the user data as much as possible.

As another example, UCI may be piggybacked on a grant-free resource if the time at which the UCI is generated is before the start time of the grant-free resource. This example may be applied together with the previous example or independently of the previous example. In the case where the UCI is piggybacked on a transmission of a grant-free resource, the UCI may be transmitted only in a specific transmission. The specific transmission may be one of an initial transmission of the grant-free resource, a last transmission of the grant-free resource, or a transmission determined by the BS. In other words, to reduce the control overhead caused by the UCI, the generated UCI may be included only in the specific transmission, wherein the specific transmission may be an initial transmission, a last transmission, or a transmission at a specific time determined by the BS. The specific time may refer to a periodic or non-periodic time, and may be based on a frame structure such as the number of transmissions or a slot number. More specifically, the BS may assume UCI piggyback in a K-th transmission or a specific slot. Alternatively, in order to enhance reliability of the grant-free transmission, the UCI may be included at first but may not be included after a predetermined number of repetitions. Alternatively, the UCI may be included according to the reliability if the reliability differs among grant-free transmissions. For example, to enhance reliability of grant-free transmission, if the power or the size of resources increases with each repetition, the UE may include the UCI only in the last repetition or a transmission using power or resources above a certain threshold. Alternatively, in order to prioritize grant-free transmission, the UCI may be excluded from transmission if power or resources above a certain threshold are used.

Alternatively, a UCI that needs to be transmitted first may be included in all grant-free transmissions. Thereby, reliability of the UCI may be secured.

Alternatively, the UE may announce that UCI will be transmitted and may perform a grant-free transmission including the UCI to the BS. If the UE includes a UCI in the grant-free transmission on its discretion, the BS must perform blind decoding to receive the UCI. Since such an operation may be burdensome to the BS. Accordingly, in order to reduce blind decoding, the UE may pre-inform the BS of whether UCI is included. For example, the UE may indicate whether a UCI is included in an initial transmission or m transmissions including the initial transmission and indicate the position of the transmission including the UCI, and may include the UCI only in the transmission at the corresponding position. Alternatively, only whether the UCI is included in m transmissions may be indicated, and the UCI may be included, starting with the m+1-th transmission. The value of m may be delivered from the BS over higher layer signaling or L1 signaling, or a predetermined value may be used without signaling. If the burden of blind decoding of the indicator indicating whether the UCI is included is smaller than the burden of blind decoding of the UCI from the perspective of the BS, the UE may select an arbitrary value for m. Alternatively, when the BS receives an uplink transmission (e.g., a scheduling request) and a grant-free transmission at the same time or within a predetermined time by utilizing the existing PUCCH resources such as SR, the BS may receive grant-free transmission, assuming that the UCI is included.

In the above description, when the grant-free transmission is missed, the BS may misrecognize the number of grant-free transmissions from the UE. In this case, a transmission order may be indicated in each transmission or the initial transmission may be limited to a specific slot/mini-slot number. Alternatively, the above-mentioned issue may be avoided by including the UCI only at a certain point in time based on a frame structure such as the slot number.

ii) The time at which the UCI is generated is within the time interval of a grant-free resource:

If the time at which the UCI is generated is within the time interval of the grant-free resource, the UE may drop transmission of one of the UCI and the data according to the service associated with the data in the next repeated transmission within the grant-free resource. In addition, the UE may transmit, in the next grant-free transmission, the UCI or data that has not been dropped. That is, the methods described in relation to time 1 may be used from the next repeated transmission that can be performed. As a specific example, in the case where it is necessary to perform repeated transmission a certain number of times K to ensure reliability of UCI, or in the case where, in piggybacking, on grant-free transmission, UCI subjected to repeated transmission on the existing PUCCH resource, the number of remaining repeated transmissions of the UCI is K and the number of remaining transmissions of grant-free repetition is less than or equal to K, i) if there is a PUCCH resource available after the last grant-free repetition, UCI transmission may be continued on the PUCCH resource after the last grant-free repetition, or ii) the number of transmissions of the grant-free repetition may be increased such that the number of remaining transmissions of the grant-free repetition is K.

As another example, if the time at which the UCI is generated is within the time interval of the grant-free resource, the UCI may be dropped without being transmitting on the grant-free resource or may be transmitted through another resource. Here, if there is an available PUCCH resource that does not overlap in time with a grant-free repeated transmission that is currently in progress, the UCI may be transmitted on the PUCCH. Alternatively, if there is an available grant-based PUSCH resource that does not overlap in time with a grant-free repeated transmission that is currently in progress, the UCI may be transmitted on the grant-based PUSCH. Alternatively, the UCI may be transmitted on an available grant-free resource that does not overlap with the grant-free repeated transmission that is currently in progress. If there is grant-free PUSCH traffic that needs to be transmitted at this time, the same method as in time 1 may be used. Otherwise, only the UCI may be transmitting using the method of dropping or delaying one of the UCI and the user data according to the service associated with the UCI or the user data as described in time 1.

As another example, if the time at which the UCI is generated is within the time interval of the grant-free resource and there is an available PUCCH, the grant-free transmission may be dropped and the UCI may be transmitted on the PUCCH resource.

iii) The time at which the UCI is generated is after an end time of the grant-free resource:

If the time at which the UCI is generated is after the end time of the grant-free resource, it may be determined to drop either the UCI or the data, further considering a required delay. More specifically, if the UCI corresponds to a required latency shorter than a preset value and there is no available resource within the required latency, the UE may drop the UCI. That is, if the generated UCI has a short latency requirement shorter than or equal to SR-to-grant and there is no transmission-allowed uplink resource within the latency requirement, the UCI may be dropped. As another example, if the UCI corresponds to a latency requirement that is greater than a preset value, the UE may delay transmission of the UCI. That is, if the generated UCI is not latency-sensitive, it may be postponed and transmitted on the next available uplink resource. If the UCI corresponds to a latency requirement that is greater than a preset value and there is no available resource within a preset time, the UE may drop transmission of the UCI. This means that if there is no available uplink resource and thus the UCI is not transmitted even after a certain threshold time, the UCI is dropped. As another example, if there is a grant-free resource available within a certain time interval, the UE may handle (dropping) in the same manner as in time 1. As another example, a grant-free repetition transmission that has been performed previously may be additionally repeated to transmit the UCI therethrough. In this case, if repeated transmission of the UCI is required, the configuration of including the generated UCI in a specific transmission as described in time 2 may be used.

The above descriptions have been made for each time. In using the above-described methods, the respective methods may be applied to UCI independently or in combination. Likewise, configurations related to CSI, ACK, and the like described below may be used independently or in combination. For example, one of the above descriptions may be used for transmission of UCI and PUSCH at each time point, and one of the configurations described below may be used for ACK transmission.

In addition, in piggybacking the UCI on the PUSCH, the number of repetitions thereof may be set differently from the number of multi-slots or multi-mini-slots in PUCCH transmission, and it may be assumed that the same UCI is piggybacked by the number set at the start point. For example, in the case of AP-CSI trigger, in transmitting the multi-slot PUSCH, the UCI may be carried only by the number of repetitions of the AP-CSI. Considering a case where the UCI is dropped due to SFI or the like, it may be assumed that the UCI is transmitted only on a semi-static UL resource or a valid UL resource. When the AP-CSI is scheduled without UL-SCH, the PUSCH only needs to be transmitted by the number of UCI repetitions.

Transmission of UCI and PUSCH Associated with Grant-Free Resource

When the UE acquires information about two or more UL radio resources and the radio resources are simultaneously present in one scheduling time interval, the UE may perform UL transmission on the corresponding radio resources at the same time. Prior to this UL transmission, it may be necessary for the UE to determine whether to perform simultaneous UL transmission according to the simultaneous transmission capability of the UE, the Tx power headroom required for simultaneous transmission, and/or the simultaneous transmission information element of a simultaneous transmission configuration of the network. For example, in the case where the UE is allocated a grant-free PUSCH radio resource and a PUCCH radio resources in different frequency regions in the same slot at the same time, if the network allow simultaneous transmission and the UE determines that simultaneous transmission is possible, the UE may perform UL transmission on the two radio resources at the same time. For example, the UE may determine whether to perform simultaneous transmission considering a simultaneous transmission-enabled flag included in the higher layer signaling received from the BS and a preset simultaneous transmission capability of the UE. All or part of the simultaneous transmission information elements may be used for the determination and have dependency on each other. More specifically, simultaneous transmission configuration may be obtained from the network according to the simultaneous transmission capability of the UE or the Tx power headroom. As a more specific example, the UE may transmit, to the network, a capability signal for grant-free UL transmission and PUCCH simultaneous transmission, and the network may configure whether simultaneous transmission is possible over high layer signaling, through DCI corresponding to the PUCCH transmission, or on a third channel, referring to the UE capability.

When the UE acquires a PUSCH resource and a PUCCH resource and there is a UCI to be transmitted, transmitting the UCI on the PUSCH resource may be considered if it is determined that simultaneous transmission cannot be performed using the above method. In this case, if the PUSCH is a grant-free resource, the following details may be additionally considered, in contrast with the grant-based PUSCH.

First, whether there is UL-SCH to be transmitted may be considered. The grant-free PUSCH is used when there is UL-SCH data to be transmitted. Accordingly, when there is no UL-SCH data to be transmitted, the PUCCH resource may be used even if there is UCI to be transmitted and a configured PUSCH resource. That is, if there is no data to be transmitted, grant-free resources are not used for UCI transmission only.

Second, the type of the configured grant may be considered. Whether to perform UCI piggyback may be separately (configured) according to the two grant-free resources of NR, Type 1 and Type 2 resources.

The following details may be considered in performing UCI piggyback transmission on a grant-free resource.

In a case where the UE can perform simultaneous PUCCH-PUSCH transmission, when configured, the PUCCH may always be separately transmitted to avoid UCI piggyback on the grant-free resource. Even in this situation, the UCI may be transmitted on a grant-free resource (if configured) and dropped if a PUSCH (e.g., AP-CSI) with the UCI in one carrier collides with the grant-free resource and is dropped.

When it is assumed that PUSCH piggyback is always applied, if the UE fails to perform simultaneous PUCCH-PUSCH transmission, a PUSCH on which piggyback is to be performed may be selected using one of the following methods. Piggybacking may be performed on a PUSCH of a carrier having the lowest scell index among the carriers for which no grant-free resource is configured among the carriers having the same or narrower subcarrier spacing than the active BWP of the carrier on which the PUCCH is transmitted. Alternatively, UCI may be piggybacked on a PUSCH of a carrier having the lowest scell index among the carriers for which no grant-free resource is configured among the carriers on which multiple PUSCHs can be transmitted. If there is no PUSCH on the above-described carrier, (grant-based) piggyback may be performed on a carrier having a grant-free configuration in PUSCH transmission.

When non-slot scheduling is used in new RAT, the UE may use only some time resources in symbol units, not the whole slot. Such non-slot scheduling may be applied to both the PUCCH and the PUSCH. When both the PUCCH and the PUSCH or one of the PUCCH and the PUSCH uses non-slot scheduling, only a part of PUCCH or PUSCH transmission may be overlapped. When it is expected that the PUCCH and the PUSCH allocated to the UE partially overlap each other in a slot, the UE may perform one of the following operations.

UCI piggyback may be used regardless of the number of symbols on which the PUSCH and the PUCCH overlap with each other. Alternatively, UCI piggyback may be performed when the number of symbols on which the PUSCH and the PUCCH overlap with each other is greater than or equal to a predetermined value, K. If the number of symbols is less than K, the UE may drop either the PUCCH or the PUSCH. UCI piggyback may be performed only when all the time resources of PUCCH scheduling are fully included in PUSCH scheduling.

Determination of the Number of Repetitions

In the new RAT, the number of repetitions of PUCCH transmission and PUSCH transmission may be set separately. For example, for PUCCH transmission, the number of UCI repetitions may be separately designated in allocating PUCCH resources. For a grant-free PUSCH, the number of repetitions may be allocated individually for each grant-free configuration through RRC configuration. For a grant-based PUSCH, a slot-aggregation factor may be used. These values may be different from each other. When a UCI allocated together with a PUCCH resource is piggybacked on the PUSCH, an ambiguity related to determination of the number of repetitions to be used for UCI repetition may occur. First, a case where the start of K1 PUCCH repetitions and the start of K2 PUSCH repetitions are the same may be considered. In this case, one or more of the following methods may be used.

As an example, whether to perform UCI piggyback may be determined for every repetition of the PUCCH resource. That is, when the UCI is piggybacked on the data transmission, whether to piggyback may be determined every time the PUCCH resource is repeated.

As another example, K1 may be ignored and repetition corresponding to K2 subjected to piggybacking may be used. In this case, even if the number of determined repetitions is smaller than the number of repetitions of the PUCCH or PUSCH, any additional repetition may not be performed.

As another example, K2 may be ignored and repetition may be performed as many times as K1, which is the number of repetitions of the PUCCH resource mapped to the UCI that is piggybacked. In this case, even if the number of determined repetitions is smaller than the number of repetitions of the PUCCH or PUSCH, any additional repetition may not be performed.

As another example, the number of repetitions of one of the PUSCH resource and PUSCH allocated at the same time that is smaller than the number of repetitions of the other one may be used.

As another example, the number of repetitions of one of the PUSCH resource and PUSCH allocated at the same time that is larger than the number of repetitions of the other one may be used.

As another example, K1 UCI repetitions may be performed in K2 aggregated PUSCH resources as many as possible. In this case, even if K1>K2, no additional repetition may be performed. In this case, UCI may be piggybacked only on a PUSCH at the time when a PUCCH associated with the UCI repetition is present.

As another example, UCI may be piggybacked on resources only from the resource on which PUCCH and PUSCH overlap with each other for the first time up to the last PUSCH repetition, regardless of the number of PUCCH repetitions.

If the position of the initial slot differs between the PUCCH repetition and the PUSCH repetition, a repetition may be started during another repetition. When one repetition is terminated, the number of times of the other repetition may not be sufficient depending on the difference.

Drop of PUSCH Resource for UCI or Other PUSCH Transmission

As described above, the UE may transmit UCI and UL-SCH data together. However, considering the characteristics of the contention-based PUSCH resource, the UE may not guarantee reliability of the UCI on the contention-based PUSCH. Therefore, when reliability of the UCI is important, the UE may drop the PUSCH grant to prioritize the UCI. In this case, the following methods may be used to compensate for the dropped PUSCH transmission.

First, if PUSCH transmission is cancelled due to UCI transmission, the UE may perform the PUSCH transmission on the next available UL resource. Here, the available resource may be one of i) the next slot having UL symbol in same time-domain allocation of the dropped PUSCH, and ii) the next transmission occasion for repetition of the dropped PUSCH.

Secondly, if the dropped PUSCH resource is a PUSCH associated with higher priority traffic such as URLLC, the traffic may be transmitted on another PUSCH having a relatively lower priority in another cell. Here, the traffic may be distinguished based on the information transmitted over L1 signaling or higher layer signaling.

Just as the UCI can drop the PUSCH, it may be considered that the PUSCH for eMBB is dropped by the PUSCH for URLLC. The latency of the PUSCH transmission associated with URLLC traffic may be reduced by dropping the PUSCH for eMBB. Here, considering a situation where the UCI is piggybacked on the PUSCH for eMBB, the following UE operations may be considered for the UCI, the PUSCH for eMBB, and the PUSCH for URLLC. Even if a PUSCH can be dropped by other PUSCH transmission for URLLC or the like in a typical situation, it may not be dropped by the other PUSCH and but have a priority if UCI requiring high reliability, such as ACK/NACK, is piggybacked. Here, the condition for having a priority may vary according to the UCI piggybacked on the PUSCH. For example, a PUSCH on which a UCI such as CSI is piggybacked may be dropped or have a lower priority than a PUSCH on which a UCI such as ACK/NACK is piggybacked.

In the case where the UE can perform simultaneous PUCCH-PUSCH transmission when UCI is piggybacked on a grant-free resource, when configured, the PUCCH may always be separately transmitted to avoid UCI piggyback on a grant-free (resource). Even in this situation, the UCI may be transmitted on a grant-free resource (if configured) and dropped if a PUSCH (e.g., AP-CSI) with the UCI in one carrier collides with the grant-free resource and is dropped.

HARQ ACK Transmission Associated with Grant-Free Resource

In the new RAT system, the position of the PUCCH or uplink resource may be changed dynamically or semi-statically depending on the cell configuration. In terms of latency, semi-persistently allocated grant-free resources may be utilized for UCI transmission.

HARQ ACK/NACK feedback may be transmitted on a grant-free resource. In order for the network to distinguish the HARQ feedback sent from the UE from the user data and receive the same, the network should be capable of knowing in advance that the UE will send the UCI on the corresponding resource. For example, it may be pre-agreed that UCI is piggybacked from the second or later transmission of a UE performing grant-free repetition or retransmission by ACK/NACK of a BS. Alternatively, ACK/NACK timing may be explicitly indicated in the DL grant DCI for DL transmission and a grant-free resource may be used if there is no separate UL resource. To piggyback HARQ ACK/NACK on a grant-free resource, the following methods may be used.

A method of piggybacking ACK/NACK on the DMRS may be considered. More specifically, ACK/NACK information may be modulated and transmitted on some or all of the DMRS symbols. Thereby, ACK/NACK may be piggybacked without reducing the size of the user data region.

Alternatively, in the case where the DM-RS is based on QAM, DM-RS sequence generation based on 16 QAM may be assumed in using the corresponding scheme. According to the corresponding scheme, sequences with a small value of cross-correlation between DM-RSs may be selected and used.

Alternatively, ACK/NACK information may be transmitted on the entire grant-free resources including the DMRS. For example, even when there is no UL user data to be transmitted, the entire grant-free resources are used to send ACK/NACK as in the case of the PUCCH if the PUCCH resource cannot be used due to a dynamic slot format change or the like. In this case, the position of the DMRS may be a position given when the same PUCCH format is used.

Alternatively, A/N information may be transmitted over CRC.

Alternatively, a region of some grant-free resources grant-free resources may be punctured with grant-free ACK/NACK to perform transmission. For example, an RE near the DMRS may be allocated to ACK/NACK such that ACK/NACK transmission can be performed by puncturing the user data when transmission of the ACK/NACK is required. This method is similar to the method of piggybacking HARQ-ACK on the PUSCH.

Alternatively, in the case where the BS pre-defines the region, a pre-defined region of grant-free resources may be rate-matched with grant-free ACK/NACK to transmit the ACK/NACK. For example, an RE near the DMRS may be allocated to ACK/NACK such that ACK/NACK transmission can be performed rate-matching the user data when ACK/NACK transmission is required. This operation may be performed by all grant-free UEs to enhance reliability of UCI. That is, if PUSCHs simultaneously transmitted from multiple UEs reserve a UCI region and only one UCI is transmitted, the receiving UE may read the UCI regardless of collision. In the case of this method as well as the above method, it may be necessary to identify the UE that has performed the UCI transmission. In particular, in this case, when multiple UEs transmit a PUSCH but only one UE performs UCI transmission, the PUSCH is subjected to collision. Accordingly, if the UEs having transmitted the PUSCH are not known or only the IDs of the UEs that have transmitted the PUSCH are known, it is not possible to identify the UE to which the UCI belongs. To address this issue, CRC may be used for UE ID in UCI, or different UCI resources or different scrambling may be used for the respective UEs.

When a NACK-to-ACK error occurs, the UE has a large latency. Therefore, considering this point, the UE may selectively transmit the HARQ feedback on the grant-free (resource) according to determination of the UE or the BS. In order to secure reliability of HARQ feedback or grant-free transmission the HARQ feedback transmitted therewith when the HARQ feedback is transmitted on the grant-free resource, the power, time/frequency resources, and the number of repeated transmissions used for grant-free transmission may be configured differently. As a specific example, when power P1 is used for the existing grant-free transmission, power P2 may be used in transmitting HARQ-ACK in the grant-free transmission (where P1<P2<P_max). Here, the value of P2 may be a specific value received by higher layer signaling or L1 signaling, or a value relative to P1 or P_max. Alternatively, since the power of grant-free transmission may vary according to the number of RBs, it may be assumed that power-related parameters of grant-free PUSCH transmission and HARQ-ACK transmission may be separately configured. Specifically, P0 may be set differently, or the target received threshold or alpha value may be set differently.

As another method, when a UE can use a plurality of grant-free resources having different resource sizes, the largest grant-free resource among the available grant-free resources may be used in transmitting HARQ-ACK in the grant-free transmission. Alternatively, if the UE is allowed to adjust a resource to be used for the grant-free transmission on a determined UL resource, the largest resource may be used. Alternatively, in the case where the UE transmits only HARQ-ACK in grant-free transmission without user data, the smallest resource may be used to lower the resource collision probability. Alternatively, the MCS of the PUSCH may be adjusted in HARQ-ACK transmission or UCI transmission in consideration of reduction of effective resources.

As another method, in the case where the UE transmits HARQ-ACK in the grant-free transmission, the number of repeated transmissions may be increased. For example, in the case where repeated transmission is performed K times in typical grant-free transmission, repeated transmission may be performed K' times in grant-free transmission with the HARQ-ACK (where K<K'). Here, K' may have a specific value received by higher layer signaling or L1 signaling, or a value relative to K.

When UCI can be transmitted simultaneously with the grant-free PUSCH, the RNTI or CRC masking may be used differently or resources to be used may be configured differently in order to distinguish whether the PUSCH has the UCI. When UCI can be transmitted on the grant-free PUSCH, the UCI allowed to be transmitted may be limited to a specific UCI. For example, the UCI may be limited to HARQ-ACK transmission requiring low latency, HARQ-ACK transmission corresponding to a PDSCH transmitted through low latency based scheduling (e g., mini-slot based scheduling), CSI feedback for low latency and high reliability, or CSI feedback having a target BLER greater than or equal to a specific value. This limitation is also applicable even when the UCI is transmitted on a different channel (e.g., PUCCH) simultaneously with a grant-free PUSCH.

When a PUCCH resource on which HARQ feedback transmission can be performed is present in the same slot as a grant-free resource, if the UE has user data that needs to be transmitted and simultaneous transmission on the two resources is enabled, the resources may be used simultaneously. For example, a UE capable of simultaneous transmission on a PUCCH and a PUSCH may transmit the PUSCH on a grant-free resource at the same time as PUCCH transmission. It is expected that a UE capable of simultaneously transmitting URLLC/eMBB of the new RAT system is also capable of simultaneously transmitting PUSCH and PUCCH. In the new RAT system, in order to reduce the PAPR of the UE, it is considered to arbitrarily change the position of the PUCCH to a position where the PAPR decreases in the case where the UE simultaneously transmits PUCCH and PUSCH. However, in case of grant-free transmission, the network cannot know whether the PUSCH is transmitted by the UE even when short PUCCH/PUSCH or long PUCCH/PUSCH is used. Accordingly, the UE needs to conform to network scheduling rather than dynamically changing the PUCCH resource. In addition, when the UE performs simultaneous transmission of PUSCH/PUCCH, the Tx power required for the transmission may be limited by MPR or the like. This case may be handled in the same manner as in the case where simultaneous transmission is impossible, or the Tx power required for the transmission may be down-scaled. As a specific example of down-scaling of the Tx power, the following methods may be used.

First, in order to prioritize reliability of the UCI, the set Tx power may be used on the PUCCH resource without being down-scaled, and the surplus Tx power may be used for the grant-free transmission. Even when the surplus Tx power of the UE is greater than the power required for the grant-free transmission, the UE may use only a required amount of power for the grant-free transmission, considering that the grant-free resource can be shared among the UEs. In this case, the UE may use the surplus power to increase the Tx power of the PUCCH transmission. More specifically, the UE may arbitrarily increase the Tx power for the PUCCH within an allowable range set by the BS. Here, the allowable range may differ among the transmission formats of the PUCCH.

Second, considering reliability of the grant-free resource, Tx power considering pathloss of a cell may be preferentially allocated and the remaining power may be allocated to the PUCCH. If the PUCCH transmission power is less than a threshold (e.g., the allocated transmission power is lower than the required power by x dB or more), (power allocation) may be performed in the same manner as when the UE cannot perform simultaneous transmission. Here, grant-free transmission may be prioritized over the PUCCH.

Third, Tx power may be assigned to the grant-free transmission and the PUCCH equally or at a certain ratio. The certain ratio may be (a value determined by) higher layer signaling or L1 signaling or a value predetermined without separate signaling.

Fourth, if the UE determines that the available Tx power is inappropriate for simultaneous transmission on two UL resources, the UE may drop one of the transmissions. This operation may be considered as a case where simultaneous transmission is not performed.

Fifth, the UE may arbitrarily down-scale the Tx power to perform UL simultaneous transmission. In this case, the UE may arbitrarily select and use one of the above four methods.

When the UE cannot perform simultaneous transmission, if the traffic of ACK/NACK that needs to be transmitted is latency-tolerant traffic (e.g., eMBB) or slot-based (with larger TTI) scheduling grant-free transmission is latency-sensitive (e.g., URLLC) or mini-slot based (with smaller TTI) scheduling, the ACK/NACK transmission may be dropped or postponed and the grant-free PUSCH transmission may be prioritized. Alternatively, to perform ACK/NACK transmission, the ACK/NACK may be piggybacked on the grant-free PUSCH transmission. In particular, this approach may be preferred in the case where the ACK/NACK is associated with latency-sensitive traffic (e.g. URLLC) and the grant-free transmission is also latency-sensitive transmission (e.g. URLLC). If ACK/NACK traffic that needs to be transmitted is latency-sensitive traffic (e.g., URLLC) and grant-free transmission is latency-tolerant transmission (e.g., eMBB), the PUCCH transmission may be prioritized and the grant-free PUSCH transmission may be dropped or postponed. If both ACK/NACK and grant-free traffic are latency-tolerant, the ACK/NACK may be piggybacked on the grant-free transmission considering the PAPR of the UE, or the PUCCH transmission may be prioritized with the grant-free transmission dropped or postponed. Therefore, when simultaneous transmission of ACK/NACK and grant-free UL is not possible, the UE may i) transmit the HARQ-ACK by piggybacking the HARQ-ACK on the grant-free transmission, ii) drop or postpone the grant-free transmission and transmit the HARQ-ACK on the PUCCH, or iii) drop or postpone the HARQ-ACK and perform grant-free transmission of only user data.

These operations may be determined automatically by the service associated with each transmission as described above or may be determined dynamically or semi-statically by signaling from the BS.

If the UE cannot perform simultaneous transmission and PUCCH transmission is prioritized in the current slot, SR may be included in ACK/NACK transmission that is to be performed. For example, a UE performing grant-free transmission may acquire a grant-based resource by including an SR in a DL ACK/NACK transmission.

Alternatively, an UL resource to be used to transmit ACK/NACK may be determined by the type of a service regardless of whether the UE performs simultaneous transmission. For example, when a latency-sensitive service such as UL URLLC is used on a grant-free resource, UCI transmission of DL eMBB may be dropped or postponed for sufficient power of grant-free transmission even if simultaneous transmission is possible. Similarly, when transmission of ACK/NACK of DL URLLC is needed, use of a grant-free resource may be considered for low latency. More specifically, for ACK/NACK for a latency-sensitive service such as a DL URLLC, an uplink resource that is closest to the ACK/NACK in time among the available uplink resources such as an available PUCCH, grant-based PUSCH, and grant-free PUSCH. In this case, the UE may use only one DL HARQ process to reduce overhead. This operation may be determined by L1 or higher layer signaling from the BS. More specifically, in the process of the BS allocating a grant-free resource to a UE, the BS may announce whether simultaneous transmission or usage of the grant-free resource through the parameter of L1 signaling. The usage may be associated with a service used by the UE, such as UL URLLC, DL and URLLC UCI, or simply indicate a latency requirement. Even when the BS allocates a grant-free resource to a UE through semi-static high layer signaling, the usage of the grant-free resource or the priority order of the services may be indicated in the signaling. More specifically, the ID of a bearer to use the grant-free resource may be indicated in a grant-free allocation message. Both a grant resource and a grant-free resource may be configured for the UE in one slot or at one timing, and the two resources may be transmitted simultaneously or only one resource may be transmitted according to the capability of the UE. In this case, in order to determine which payload is to be mapped to the resources in the physical layer, a resource to be used for each MAC message or Queue may be indicated.

In the case where the HARQ-ACK is dropped due to a collision with the grant-free PUSCH, the network may transmit an HARQ-ACK polling command. At this time, dropped HARQ-ACKs may be transmitted as well. Alternatively, in case of such a collision, the dropped HARQ-ACKs may be transmitted on a semi-statically configured resource for HARQ-ACK polling on the assumption that HARQ-ACK polling has been implicitly requested. As another method, the dropped HARQ-ACK may be transmitted on the first HARQ-ACK resource after the collision. In this case, since the HARQ-ACK bits may be different, different resources are used. Similar to SR+HARQ-ACK, it is assumed that resources for this situation are preconfigured and that different HARQ-ACK resources are used when such a situation occurs. That is, different resources are used depending on presence or absence of the postponed HARQ-ACK. For example, when it is positive, a semi-statically configured resource is used. When it is negative, a dynamically configured resource is used.

Scheduling Request (SR) Transmission Associated with Grant-Free Resource

Generally, the SR is cancelled when there is a PUSCH transmission. Hereinafter, handling of transmission of the SR in the presence of transmission on a grant-free resource will be described.

The grant-free resource may be generally configured for intermittent data transmission. In this case, the data that the UE intends to transmit may be unidentifiable. Of course, BSR can be sent on the grant-free resource. Accordingly, when BSR is to be transmitted on a grant-free resource, the BSR may be transmitted for all bearers and the SR may be cancelled.

If one grant-free resource is for intermittent transmission of data such as URLLC, the BSR transmission may be prohibited. In this case, it may be assumed that the SR is not cancelled by the grant-free PUSCH. This assumption may be applied to type 1 and type 2 differently. When the prohibition is made in this way, a collision may occur between the SR transmission and the grant-free transmission. In this case, the grant-free resource may be separately configured such that the grant-free resource is used differently for the SR positive and negative cases (which means transmitting the SR and the grant free PUSCH simultaneously). In place of the separate resource, scrambling may be configured differently or the DM-RS sequence may be used differently. Alternatively, the RS may be dropped or postponed. Alternatively, the SR or grant free PUSCH is dropped or postponed according to priority.

When both the grant-free resource and the SR need to be configured, many resources may need to be allocated to the UE. The SR and grant-free resource are allowed to be shared in order to reduce burden of resource configuration. In other words, when there is no grant-free PUSCH transmission, it is assumed that the same resource can be used as an SR resource. In this case, the SR may be assumed to be transmitted in the PUSCH format for muxing with other resources.

Alternatively, partial sharing may be allowed. Specifically, when user data that needs to be transmitted is present in the buffer in the UE, the UE may generally send a scheduling request to the BS and expect the BS to configure a UL grant. If a resource for sending the scheduling request is not allocated by the BS, the UE may acquire the UL grant through the random access procedure. This procedure may cause latency to the UE.

When the UE is assigned a grant-free resource, the grant-free resource may be used as an SR. As a specific example, when there is no SR resource available to the UE or an available SR is present after time K, the UE may acquire an UL grant from the BS by piggybacking an SR symbol on the grant-free resource. More specifically, a method similar to the HARQ ACK/NACK piggyback may be used. Alternatively, the UE may attempt grant-free transmission to use the same as an implicit SR. More specifically, the BS may mandatorily transmit a UL grant to a UE attempting grant-free transmission. Alternatively, an SR may be transmitted by transmitting BSR even in the grant-free transmission. In this case, the BSR may be transmitted in a payload that is sent. In determining time K, whether there is contention of a grant-free resource may be considered. For example, the grant-free resource is contention-free, K may be set to be shorter.

When the UE acquires all of user data that needs to be transmitted, an SR transmission resource, and a grant-free resource, the UE may acquire an UL grant through the SR for data transmission or may directly attempt transmission on the grant-free resource. When the grant-free resource is contention-free, it is reasonable to perform transmission on the grant-free resource. Otherwise, the UE may select one considering the characteristics of the traffic. For example, in the case of latency-sensitive traffic, the time required to receive a UL grant has a relatively large effect, and accordingly a grant-free resource may be selected. When the UE is semi-persistently allocated a grant-free resource, the BS may not explicitly indicate whether the resource is contention-based or contention-free. In this case, the UE may select one considering the characteristics of the traffic. For example, when the traffic requires reliable transmission and it is unknown whether contention is involved, the UE may prioritize grant-based transmission.

Transmission of Aperiodic/Periodic CSI Associated with Grant-Free Resource

When periodic CSI is configured for the UE, there may be no transmittable UL resource in a corresponding time interval. Or a UL resource allocated by dynamic or semi-static cell configuration may be unusable even when aperiodic CSI is configured. In this case, if a semi-persistently allocated grant-free resource is available, it may be used for CSI transmission. For example, when the aperiodic CSI resource becomes unavailable, user data to be transmitted on a grant-free PUSCH resource may be dropped or postponed and aperiodic CSI may be transmitted. Alternatively, the user data to be transmitted on the grant-free PUSCH resource may be rate-matched or punctured so as to be transmitted together with the aperiodic CSI, and the BS may blind-detect the same using the CRC or the like included in the CSI. As another example, when periodic CSI transmission is needed, CSI may be piggybacked on a grant-free PUSCH resource. Alternatively, when a UE which is not capable of simultaneous transmission of PUCCH/grant-free PUSCH repeatedly performs the same PUCCH transmission for reliable aperiodic/periodic CSI transmission, the CSI may be piggybacked on the grant-free transmission in order to not postpone the grant-free transmission. In this case, as the piggyback method, one of the methods used in transmitting the HARQ-ACK on a grant-free (resource) may be applied. When the HARQ-ACK and the CSI are piggybacked on the grant-free resource at the same time, at least the resources to be used therefor may be different from each other even if the HARQ-ACK and the CSI are piggybacked using the same method. In order to address decrease of the BLER that occurs in piggybacking CSI, a method of varying the power, the resource, and the number of repetitions used for grant-free transmission may be used, similar to the case of HARQ-ACK. Alternatively, the CSI transmission may be dropped to protect the grant-free PUSCH transmission. For example, when the traffic to be transmitted on the grant-free PUSCH requires high reliability and low latency as in the case of URLLC, the CSI transmission may be dropped considering the block error rate that will be increased when the CSI is transmitted together.

If the UE is capable of simultaneous transmission of PUCCH/grant-free PUSCH, it may simultaneously transmit the CSI and the user data on the PUCCH and the grant-free PUSCH, respectively, similarly to the case of HARQ-ACK. In this case, scaling of Tx power may also be performed using one of the methods used for simultaneous HARQ-ACK and grant-free transmission.

Although the above descriptions has been made in relation to the UL channel/signal and grant-free radio resources, embodiments are not limited thereto. The descriptions are applicable even to a DL channel/signal and other radio resources.

The above descriptions are not limited to direct communication between UEs but may also be used on UL or DL. In this case, a BS or a relay node may use the above-described methods.

It is apparent that examples of the proposed schemes described above can also be included as one of the implementation methods of the present invention, and thus can be regarded as a kind of proposed schemes. In addition, the proposed schemes described above may be implemented independently or in combination (or merge) of some of the proposed schemes. A rule may be defined such that the information on whether the proposed methods are applicable (or information on the rules of the proposed methods) shall be announced to a UE by a BS over a predefined signal (e.g., a physical layer signal or a higher layer signal), shall be signaled to a receiving UE by a transmitting UE, or shall be requested to the transmitting UE by the receiving UE.

Device Configuration According to Embodiments of the Present Invention

Figure 12:
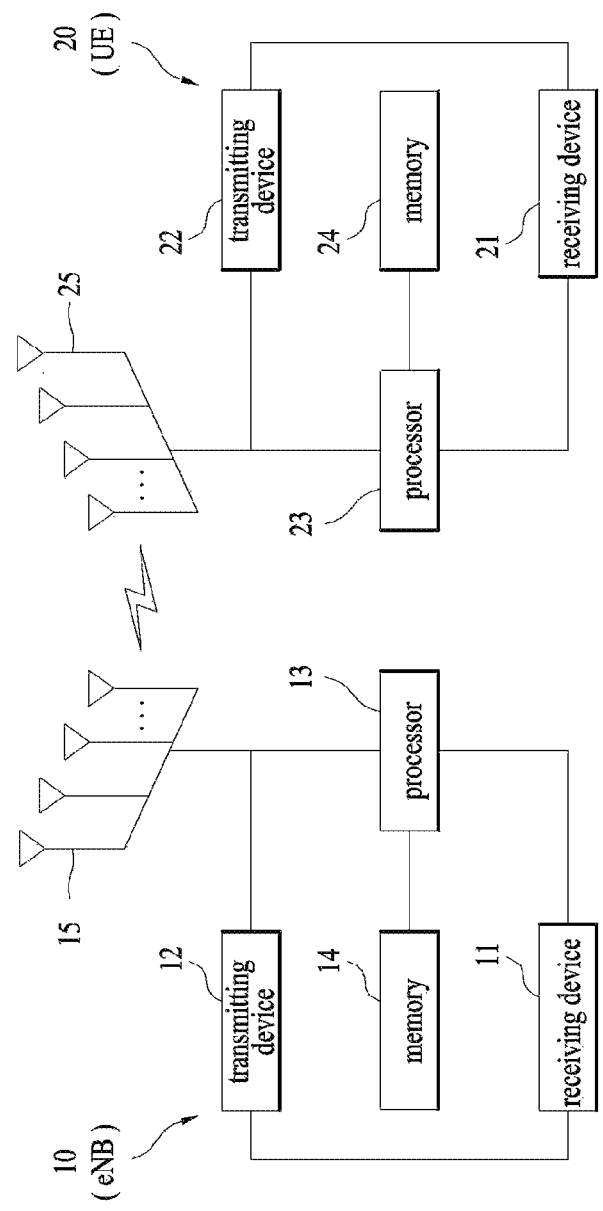
FIG. 12 is a diagram showing a configuration of a transmission device and a reception device.

FIG. 12 is a diagram showing a configuration of a transmission point apparatus and a UE according to an embodiment of the present invention.

Referring to FIG. 12, a transmission point apparatus 10 may include a reception device 11, a transmission device 12, a processor 13, a memory 14, and a plurality of antennas 15. The plurality of antennas 15 represents the transmission point apparatus supporting MIMO transmission/reception. The reception device 11 may receive various kinds of signals, data and information on the uplink from the UE. The transmission device 12 may transmit various kinds of signals, data and information on the downlink to the UE. The processor 13 may control overall operation of the transmission point apparatus 10. The processor 13 of the transmission point apparatus 10 according to one embodiment may process details necessary in each of the above-described embodiments.

The processor 13 of the transmission point apparatus 10 may also perform a function of computationally processing information received by the transmission point apparatus 10 and information to be transmitted to the outside, and the memory 14 may store the computationally processed information and the like for a predetermined time, and may be replaced by a component such as a buffer (not shown).

Next, referring to FIG. 12, a UE 20 may include a reception device 21, a transmission device 22, a processor 23, a memory 24, and a plurality of antennas 25. The plurality of antennas 25 represents the UE supporting MIMO transmission/reception. The reception device 21 may receive various kinds of signals, data and information on the downlink from a base station. The transmission device 22 may transmit various kinds of signals, data and information on the uplink to the base station. The processor 23 may control overall operation of the UE 20.

The processor 23 of the UE 20 according to one embodiment may generate uplink control information (UCI) and transmit at least one of the generated UCI and data, wherein one or more of the UCI and the data may be dropped or postponed according to a relationship between the generation time of the UCI and a time-domain position of the grant-free resource.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted.

In the example of FIG. 12, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is apparent to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method for performing transmission by a terminal using a grant-free resource in a wireless communication system, the method comprising:
generating uplink control information (UCI); and
transmitting at least one of the generated UCI and data;
wherein one or both of the UCI and the data are dropped or postponed according to a relationship between a time at which the UCI is generated and a time-domain position of the grant-free resource,
based on the time at which the UCI is generated being after an end time of the grant-free resource, the UCI or the data is dropped, and
wherein when the UCI corresponds to a latency requirement shorter than a preset value and there is no available resource within the latency requirement, the terminal drops the UCI.

2. The method of claim 1, wherein, when the time at which the UCI is generated is before a start time of the grant-free resource, the terminal drops transmission of one of the UCI and the data according to a service associated with the data.

3. The method of claim 1, wherein, when the time at which the UCI is generated is within a time interval of the grant-free resource, the terminal drops transmission of one of the UCI and the data according to a service associated with the data in a next repeated transmission within the grant-free resource.

4. The method of claim 3, wherein the terminal transmits the non-dropped UCI or data in a next grant-free transmission.

5. The method of claim 1, wherein, when the UCI corresponds to a latency requirement longer than a preset value, the terminal postpones transmission of the UCI.

6. The method of claim 5, wherein, when the UCI corresponds to the latency requirement longer than the preset value and there is no available resource within the preset time, the terminal drops transmission of the UCI.

7. The method of claim 1, wherein, when the terminal drops transmission of the user data for transmission of the UCI, the dropped data is transmitted in a next available resource.

8. The method of claim 7, wherein the next available resource is a next transmission occasion for repetition of the dropped PUSCH.

9. A terminal for performing transmission using a grant-free resource in a wireless communication system, the terminal comprising:
a transmitter and a receiver; and
a processor,
wherein the processor is configured to:
generate uplink control information (UCI); and
transmit at least one of the generated UCI and data;
wherein one or both of the UCI and the data are dropped or postponed according to a relationship between a time at which the UCI is generated and a time-domain position of the grant-free resource, based on the time at which the UCI is generated being after an end time of the grant-free resource, the UCI or the data is dropped, and wherein when the UCI corresponds to a latency requirement shorter than a preset value and there is no available resource within the latency requirement, the terminal drops the UCI.

* * * * *